US007059301B2

(12) United States Patent
Stockner et al.

(10) Patent No.: US 7,059,301 B2
(45) Date of Patent: Jun. 13, 2006

(54) END OF INJECTION RATE SHAPING

(75) Inventors: Alan R. Stockner, Metamora, IL (US); Richard H. Holtman, Dunlap, IL (US); Dana R. Coldren, Fairbury, IL (US); Mingchun Dong, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 323 days.

(21) Appl. No.: 10/370,000

(22) Filed: Feb. 20, 2003

(65) Prior Publication Data

US 2004/0163626 A1 Aug. 26, 2004

(51) Int. Cl.
*F02M 1/00* (2006.01)
*B60T 7/12* (2006.01)

(52) U.S. Cl. ...................................... 123/446; 123/467

(58) Field of Classification Search ................ 123/446, 123/445, 447, 448, 457, 458, 472, 490, 496, 123/499, 503, 506, 88–89, 533.4, 585.1, 123/585.5, 467; 239/88–89, 533.4, 585.1, 239/585.5
See application file for complete search history.

(56) References Cited

U.S. PATENT DOCUMENTS

| | | | | |
|---|---|---|---|---|
| 5,662,087 | A | 9/1997 | McCandless | |
| 5,669,355 | A | 9/1997 | Gibson et al. | |
| 5,682,858 | A | 11/1997 | Chen et al. | |
| 5,685,275 | A | 11/1997 | Djordjevic | |
| 5,687,693 | A * | 11/1997 | Chen et al. | 123/446 |
| 5,697,342 | A | 12/1997 | Anderson et al. | |
| 6,082,332 | A * | 7/2000 | Hefler et al. | 123/446 |
| 6,092,509 | A * | 7/2000 | Tanabe et al. | 123/447 |
| 6,112,721 | A | 9/2000 | Kouketsu et al. | |
| 6,158,419 | A | 12/2000 | Jett et al. | |
| 6,173,299 | B1 | 1/2001 | Brooks et al. | |
| 6,227,166 | B1 | 5/2001 | Mack | |
| 6,230,983 | B1 | 5/2001 | Kasen | |
| 6,390,070 | B1 | 5/2002 | Coldren et al. | |
| 6,439,202 | B1 | 8/2002 | Carroll, III et al. | |
| 6,453,875 | B1 | 9/2002 | Mahr et al. | |
| 6,595,188 | B1 | 7/2003 | Forck et al. | |
| 6,631,853 | B1 * | 10/2003 | Lenk et al. | 239/90 |
| 6,659,072 | B1 * | 12/2003 | Heinzelmann | 123/299 |
| 6,684,853 | B1 * | 2/2004 | Lei | 123/446 |
| 6,715,693 | B1 * | 4/2004 | Dam et al. | 239/88 |

(Continued)

FOREIGN PATENT DOCUMENTS

| | | |
|---|---|---|
| EP | 1258621 | 11/2002 |

(Continued)

*Primary Examiner*—Hai Huynh
(74) *Attorney, Agent, or Firm*—Liell & McNeil

(57) ABSTRACT

Fuel injectors equipped with direct control needle valves can add new capabilities to a fuel injection system, but can sometimes have difficulty in achieving low hydrocarbon emissions at levels comparable to ancestor fuel injectors that utilize a simple spring biased needle. The present invention seeks lower hydrocarbon emissions by reducing fuel pressure before the direct control needle valve member has reached its closed position toward the end of an injection event. Reducing fuel pressure can be accomplished in a number of ways depending upon the particular fuel injection system, including spilling fuel pressure in a cam system or possibly relieving pressure on an intensifier piston. By employing this strategy, fuel spray from the fuel injector can effectively end before the direct control needle valve member reaches its closed position, thus avoiding hydrocarbon production that could be caused by a small amount of fuel pushed into the combustion space as the needle moves over the last portion of its movement toward its closed position.

19 Claims, 8 Drawing Sheets

U.S. PATENT DOCUMENTS

| | | | | |
|---|---|---|---|---|
| 6,715,694 | B1 * | 4/2004 | Gebhardt | 239/89 |
| 6,910,462 | B1 | 6/2005 | Sun et al. | |
| 6,951,204 | B1 | 10/2005 | Shafer et al. | |
| 2002/0129792 | A1 | 9/2002 | Rodriguez | |
| 2004/0159716 | A1 * | 8/2004 | Azam et al. | 239/5 |
| 2004/0195385 | A1 * | 10/2004 | Lawrence et al. | 239/533.2 |
| 2005/0098144 | A1 * | 5/2005 | Stewart et al. | 123/299 |
| 2005/0150672 | A1 * | 7/2005 | Dong et al. | 239/5 |

FOREIGN PATENT DOCUMENTS

| | | |
|---|---|---|
| WO | WO 0063549 | 10/2000 |
| WO | WO 03019000 | 3/2003 |

* cited by examiner

END OF INJECTION RATE SHAPING

TECHNICAL FIELD

The present invention relates generally to end of injection rate shaping for fuel injection events, and more particularly to a method of operating a fuel injection system in a way that can reduce undesirable hydrocarbon and smoke emissions from an engine and improves fuel economy.

BACKGROUND

Engineers are constantly seeking ways to reduce undesirable engine emissions without over reliance upon exhaust after treatment techniques. One strategy is to seek ways to improve performance of fuel injection systems. Over the years, engineers have come to learn that engine emissions can be a significant function of injection timing, the number of injections, injection quantities and rate shapes. However, it is also been observed that an injection strategy at one engine operating condition may decrease emissions at that particular operating condition, but actually produce an excessive amount of undesirable emissions at a different operating condition. Thus, for a fuel injection system to effectively reduce emissions across an engine's operating range, it must have the ability to produce several different rate shapes, have the ability to produce multiple injections and produce injection timings and quantities with relatively high accuracy. Providing a fuel injection system that can perform well with regard to all of these different parameters over an entire engine's operating range has proven to be elusive.

In order to reduce hydrocarbon emissions, the conventional wisdom has been to seek an abrupt end to each injection event. This strategy flows from the conventional wisdom that reducing poorly atomized fuel spray into the combustion space toward the end of an injection event can reduce the production of undesirable hydrocarbon and smoke emissions. In the case of fuel injectors equipped with direct control needle valves, an abrupt end to injection is often accomplished by applying high pressure fluid to the back side of a direct control needle valve member to quickly move it toward a closed position while fuel pressure within the injector is relatively high. Recent data from some directly controlled fuel injection systems appear to show higher hydrocarbon and smoke emissions at certain operating conditions than those typically observed in relation to older systems in which the nozzle is controlled by a simple spring biased needle. In some fuel injection systems, closing the needle valve member at high pressure can also have structural consequences. When a needle is closed at high injection pressures, pressure can spike within the injector, and especially in the relatively sensitive area of the injector tip, exacerbating the structural strength requirements in the tip region of the fuel injector. These pressure spikes can sometimes cause small uncontrolled secondary injections that increase hydrocarbon emissions. In the case of hydraulically actuated fuel injection systems, closing the needle at high pressure can also result in a reduction in efficiency. This occurs when pressurized actuation fluid continues to pour into the fuel injector briefly after the needle has moved to close the nozzle outlet. Ending injection events at high pressure can also exacerbate the already difficult problem of producing small injection quantities, such as precisely controlled small post injection quantities.

One effort to deal with venting pressure at the end of an injection event in order to avoid small uncontrolled secondary injections is disclosed in U.S. Pat. No. 5,682,858 to Chen et al., and entitled Hydraulically-Actuated Fuel Injector With Pressure Spike Relief Valve. In this fuel injection system, closure of the direct control needle valve member occurs before the flow control valve can end supply of high pressure actuation fluid to act on an intensifier piston. This reference teaches the use of a separate pressure relief valve that opens to relieve actuation fluid pressure as the flow control valve is moving from its open position toward its closed position. This relief of actuation fluid pressure in turn relieves the downward force on the intensifier piston/plunger to also relieve fuel pressure to avoid a pressure spike. While this strategy may be effective in reducing undesirable and uncontrolled secondary injections, there still remains room for reducing hydrocarbon emissions from engines using this type of fuel injection system.

The present invention is directed to one or more of the problems set forth above.

SUMMARY OF THE INVENTION

In one aspect, a method of operating a fuel injection system includes a step of moving a direct control needle valve member to open a nozzle outlet. An injection event is ended at least in part by reducing fuel pressure before the direct control needle valve member has reached a closed position.

In another aspect, a method of rate shaping the end portion of a fuel injection event includes a step of relieving pressure on an intensifier piston at a first timing. A needle control valve is moved at a second timing. The second timing relative to the first timing is sufficient to cause fuel pressure in the fuel injector to drop before a direct control needle valve member has reached a closed position.

In still another embodiment, a fuel injector includes an injector body with a needle control chamber. A direct control needle valve member is moveably positioned in the injector body and includes a closing hydraulic surface exposed to fluid pressure in the needle control chamber. The fuel injector also includes a means for reducing fuel pressure within the injector body before the direct control needle valve member has reached its closed position.

DETAILED DESCRIPTION

Figure 1:
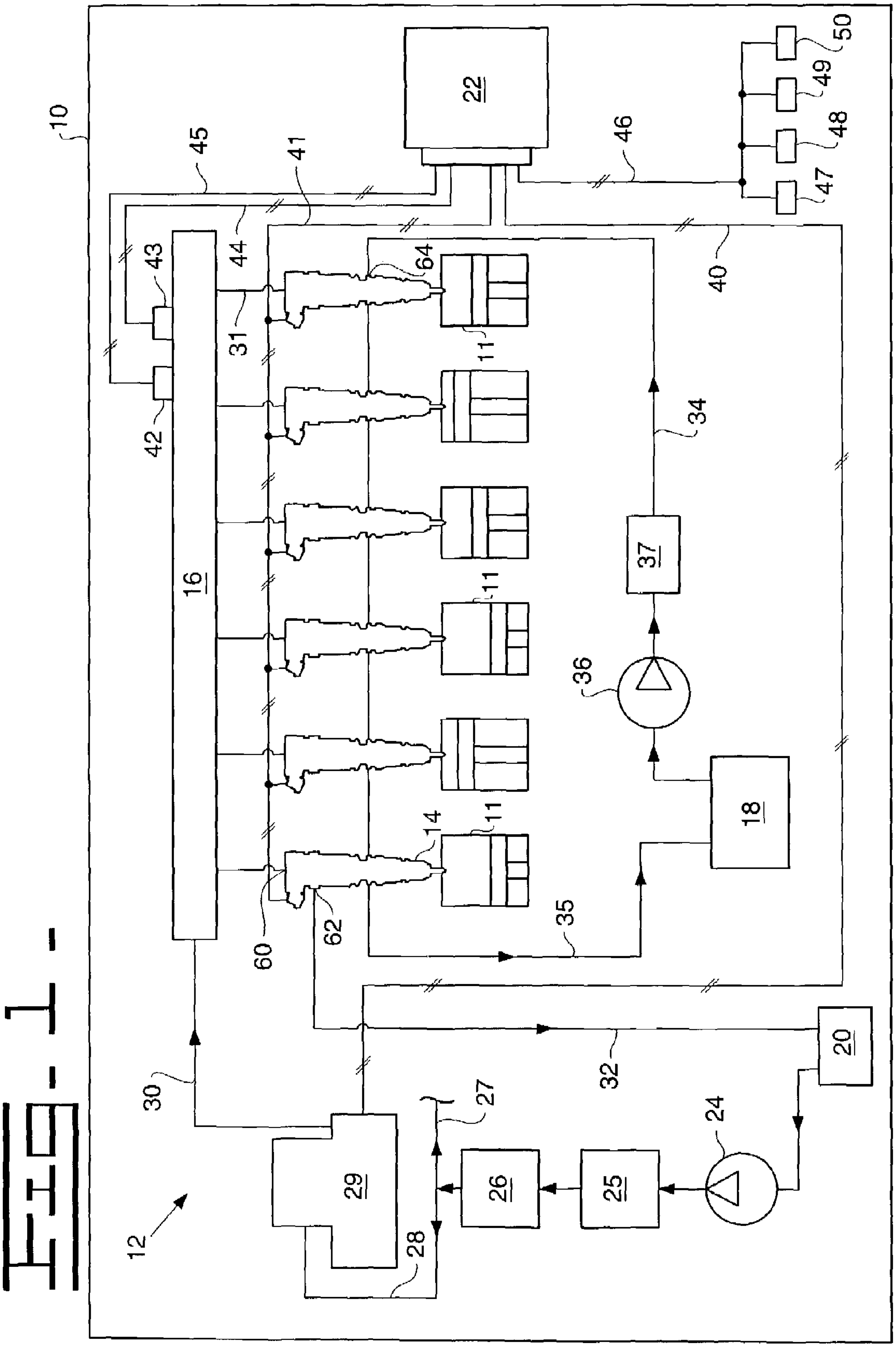
FIG. 1 is a schematic of a fuel injection system according to an embodiment of the present invention.

Referring to FIG. 1, an example diesel engine 10 includes six cylinders 11 and a common rail fuel injection system 12. The system includes an individual fuel injector 14 for each engine cylinder 11, a single common rail 16, an oil sump 20 fluidly connected to the common rail 16, and a fuel tank 18 on a separate fluid circuit. Those skilled in the art will appreciate that in other applications there may be two or more separate common rails, such as a separate rail for each side of a V8 engine. An electronic control module 22 controls the operation of fuel injection system 12. The electronic control module 22 preferably utilizes advanced strategies to improve accuracy and consistency among the fuel injectors 14 as well as pressure control in common rail 16. For instance, the electronic control module 22 might employ electronic trimming strategies individualized to each fuel injector 14 to perform more consistently. Consistent performance is desirable in the presence of the inevitable performance variability responses due to such causes as realistic machining tolerances associated with the various components that make up the fuel injectors 14. In another strategy, the electronic control module 22 might employ a model based rail pressure control system that breaks up the rail pressure control issue into one of open loop flow control coupled with closed loop error and pressure control.

When fuel injection system 12 is in operation, oil is drawn from oil sump 20 by a low pressure oil circulation pump 24, and the outlet flow is split between an engine lubrication passage 27 and a low pressure fuel injection supply line 28, after passing through an oil filter 25 and a cooler 26. The oil in engine lubrication passage 27 travels through the engine and lubricates its various components in a conventional manner. The oil in low pressure supply line 28 is raised to a medium pressure level by a high pressure pump 29. This "medium pressure" is a relatively high pressure compared to oil drain and fuel supply pressures, but still lower than peak injection pressures. Pump 29 is preferably an electronically controlled variable delivery pump, such as a sleeve metered fixed displacement variable delivery pump of a type manufactured by Caterpillar, Inc. of Peoria, Ill. High pressure pump 29 is connected to common rail 16 via a high pressure supply line 30. Each of the individual fuel injectors 14 have an actuation fluid inlet 60 connected to common rail 16 via a separate branch passage 31. After being used within individual fuel injectors 14 to pressurize fuel, the oil leaves fuel injectors 14 via an actuation fluid drain 62 and returns to oil sump 20 for recirculation via a return line(s) 32. Those skilled in the art will appreciate that any available fluid, including fuel, coolant or transmission fluid, could be utilized as actuation fluid in place of the illustrated lubricating oil.

Fuel is drawn from a fuel tank 18 by a fuel transfer pump 36 and circulated among fuel injectors 14 via a fuel supply line 34 after passing through a fuel filter 37. Fuel transfer pump 36 is preferably a constant flow electric pump with a capacity sized to meet the maximum demands for engine 10. Also, fuel transfer pump 36 and fuel filter 37 are preferably contained in a common housing. Any fuel not used by the fuel injectors 14 is recirculated to fuel tank 18 via fuel return line 35. Fuel in the fuel supply and return lines 34 and 35 are at a relatively low pressure relative to that in common rail 16, which contains pressurized oil. In other words, fuel injection system 12 includes no high pressure fuel lines (i.e. lines containing fuel at injection pressure levels), and the fuel is pressurized to injection levels within each individual fuel injector 14, and then usually for only a brief period of time during an injection sequence.

Fuel injection system 12 is controlled in its operation via an electronic control module 22 via control communication lines 40 and 41. Control communication line 40 communicates with high pressure pump 29 and controls its delivery, and hence the pressure in common rail 16. Control communication lines 41 include four wires, one pair for each electrical actuator within each fuel injector 14. These respective actuators within fuel injectors 14 control flow of actuation fluid to the injectors from rail 16, and the opening and closing of the fuel injector spray nozzle. Electronic control module 22 determines its control signals based upon various sensor inputs known in the art. These include an oil pressure sensor 42 attached to rail 16 that communicates an oil pressure signal via sensor communication line 45. In addition, an oil temperature sensor 43, which is also attached to rail 16, communicates an oil temperature signal to electronic control module 22 via a sensor communication line 44. In addition, electronic control module 22 receives a variety of other sensor signals via a sensor communication line(s) 46. These sensors could include but are not limited to, a throttle sensor 47, a timing sensor 48, a boost pressure sensor 49 and a speed sensor 50.

Figure 2:
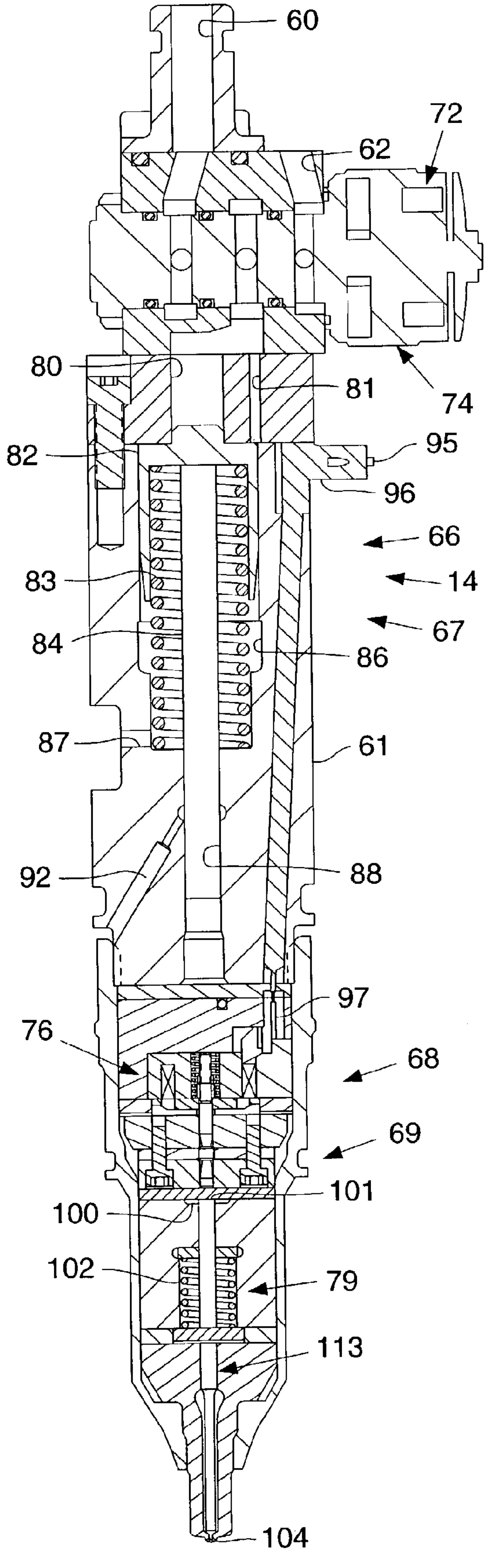
FIG. 2 is a sectioned side diagrammatic view of a fuel injector according to an embodiment of the present invention.
Figure 3:
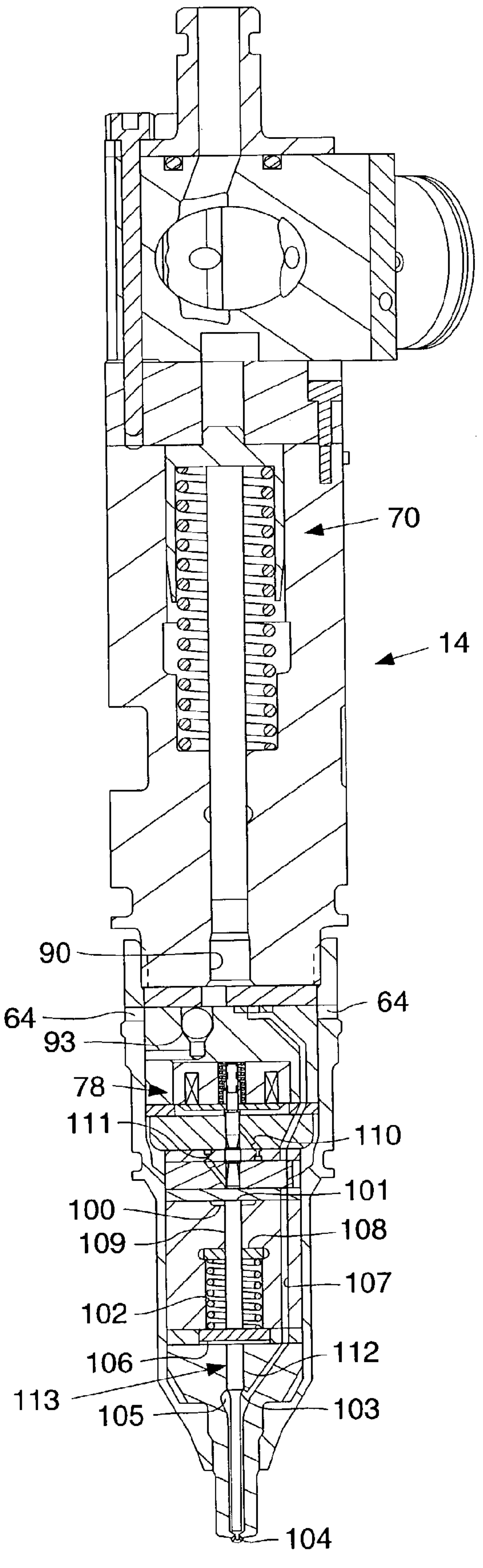
FIG. 3 is the fuel injector of FIG. 2 as viewed along a different section line.

Referring in addition to FIGS. 2 and 3, each fuel injector 14 includes an injector body 61 that can be thought of as including an upper portion 66 and a lower portion 68. Fuel injector 14 can also be thought of as being divided between fuel pressurization assembly 67 and a direct control nozzle assembly 69. In the fuel injector 14 illustrated, fuel pressurization assembly 67 is located in upper portion 66, whereas direct control nozzle assembly 69 is located in lower portion 68. Although the fuel injector 14 shows the fuel pressurization assembly 67 and the direct control nozzle assembly 69 joined into a unit injector 14, those skilled in the art will appreciate that those respective assemblies could be located in separate bodies connected to one another with appropriate plumbing. The fuel pressurization assembly 67 includes a pressure intensifier 70 and a flow control valve 74, which is operably coupled to an electrical actuator 72. Direct control nozzle assembly 69 includes a needle control valve assembly 76 that is operably coupled to an electrical actuator 78, which is located in, and attached to, lower portion 68. In addition, a direct control needle valve 79 is controlled in its opening and closing by needle control valve assembly 76, and hence electrical actuator 78. Pressurized oil enters injector body 61 through its top surface at actuation fluid inlet 60, and used low pressure oil is recirculated back to the sump 24 via an actuation fluid drain 62. Fuel is circulated among the lower portions 68 of fuel injectors 14 via fuel inlets 64.

Pressure intensifier 70 includes a stepped top intensifier piston 82 and preferably a free floating plunger 84. Intensifier piston 82 is biased to its retracted position, as shown, by a return spring 83. The stepped top of intensifier piston 82 allows the initial movement rate, and hence possibly the initial injection rate, to be lower than that possible when the stepped top clears a counterbore. Return spring 83 is positioned in a piston return cavity 86, which is vented directly to the area underneath the engine's valve cover via an unobstructed vent passage 87. Free floating plunger 84 is biased into contact with the underside of intensifier piston 82 via low pressure fuel acting on one end in fuel pressurization chamber 90. Plunger 84 preferably has a convex end in contact with the underside of intensifier piston 82 to lessen the effects of a possible misalignment. In addition, plunger 84 is preferably symmetrical about three orthogonal axes such that fuel injector 14 can be more easily assembled by inserting either end of plunger 84 into the plunger bore located within injector body 61. When intensifier piston 70 is undergoing its downward pumping stroke, fuel within fuel pressurization chamber 90 is raised to injection pressure levels. Any fuel that migrates up the side of plunger 84 is preferably channeled back for recirculation via a plunger vent annulus and a vent passage 92. Pressure intensifier 70 is driven downward when flow control valve 72 connects actuation fluid passages 80/81 to high pressure actuation fluid inlet 60. Between injection events, flow control valve 72 connects actuation fluid passages 80/81 to low pressure drain 62 allowing the intensifier 70 to retract toward its retracted position, as shown, via the action of return spring 83 and fuel pressure acting on the underside of plunger 84. Thus, when pressure intensifier 70 is retracting, fresh fuel is pushed into fuel pressurization chamber 90 past check valve 93 via fuel inlet 64.

Figure 4:
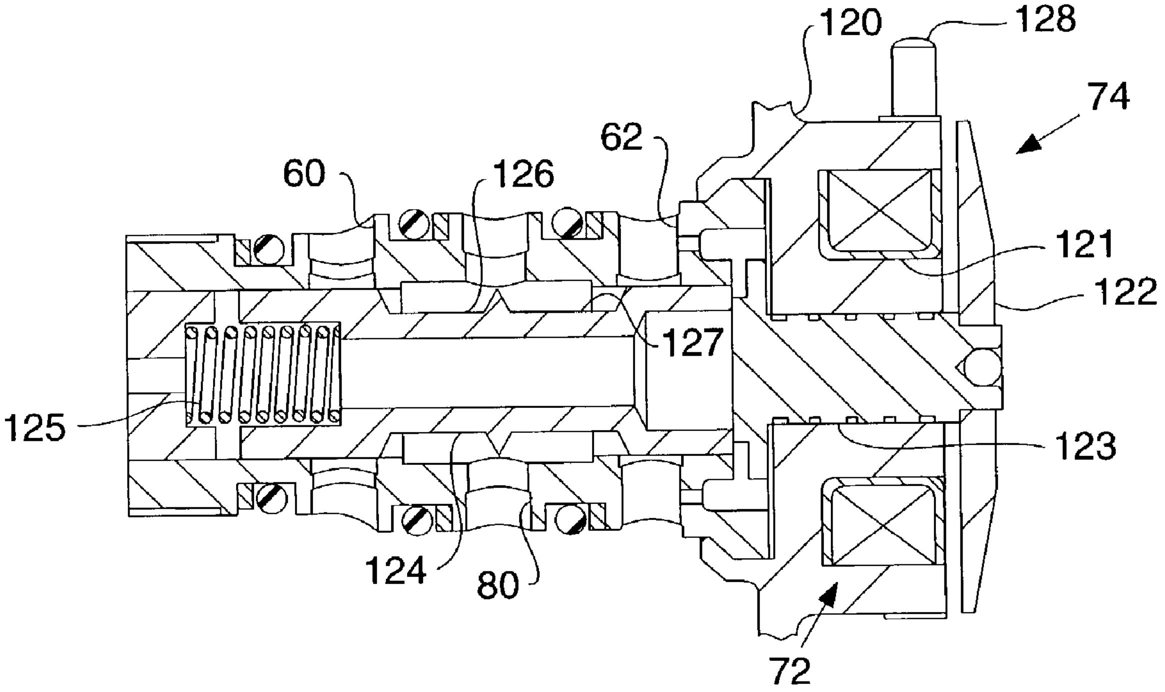
FIG. 4 is a sectioned side diagrammatic view of a flow control valve for the fuel injector of FIGS. 2 and 3.

Referring in addition to FIG. 4, flow control valve 74 includes an electrical actuator 72, which in the illustrated embodiment is a solenoid, but could equally be any other suitable electrical actuator known in the art including, but not limited to, piezos, voice coils, etc. Flow control valve 74 includes a valve body 120 that includes separate passages connected to actuation fluid inlet 60, actuation fluid drain 62 and actuation fluid passages 80/81, respectively. Flow control valve 74 includes a spool valve member 124 biased via a biasing spring 125 to a first position that fluidly connects an actuation fluid passage 80/81 to actuation fluid drain 62. When electrical actuator 72 is energized, an armature 122 moves toward coil 121. This movement causes a pushpin 123 to push spool valve member 124 away from coil 121 to compress biasing spring 125 toward a second position. At this energized position, spool valve member 124 closes the fluid connection between actuation fluid passage 80/81 and drain 62, and opens high pressure inlet 60 to actuation fluid passages 80/81. These fluid connections are facilitated via respective high pressure annuluses 126 and 127 formed on the outer surface of spool valve member 124. Control communication line 41 of FIG. 1, electronic control module 22, and electric terminals 128 that are attached to valve body 120 are electrically connected to coil 121 in a conventional manner.

When pressure intensifier 70 is driven downward, high pressure fuel in fuel pressurization chamber 90 can flow via nozzle supply passage 107 to the nozzle chamber 105, and out of nozzle outlets 104 if direct control needle valve 79 is in an open position. When direct control needle valve 79 is in its closed position as shown, nozzle chamber 105 is blocked from fluid communication with nozzle outlets 104. Direct control needle valve 79 includes a direct control needle valve member 113 made up of a needle portion 112 separated from a piston portion 109 by a lift spacer 106. Thus, the needle valve member in this embodiment is made up of several components for ease of manufactureability and assembly, but could also be manufactured from a single solid piece. The direct control needle valve member 113 includes an opening hydraulic surface 103 exposed to fluid pressure in nozzle chamber 105, and a closing hydraulic surface 101 exposed to fluid pressure in a needle control chamber 100. The thickness of lift spacer 106 preferably determines the maximum opening travel distance of direct control needle valve 79. The direct control needle valve 79 is biased toward its downward closed position, as shown, by a biasing spring 102 that is compressed between lift spacer 106 and a VOP (valve opening pressure) spacer 108. Thus, the valve opening pressure of the direct control valve 79 can be trimmed at time of manufacture by choosing an appropriate thickness for VOP spacer 108. Needle control chamber 100 is fluidly connected to either low pressure fuel inlet 64 or to nozzle supply passage 107 depending upon the positioning of needle control valve assembly 76. When needle control chamber 100 is fluidly connected to nozzle supply passage 107, direct control needle valve 79 will remain in or move toward its closed position, as shown, under the action of fluid pressure forces on closing hydraulic surface 101 and the spring force from biasing spring 102. When needle control chamber 100 is fluidly connected to fuel inlet 64, while nozzle passage 107 and hence nozzle chamber 105 are above a valve opening pressure, the fluid forces acting on opening hydraulic surface 103 are sufficient to lift the direct control needle valve member 113 upward towards its open position against the action of biasing spring 102 to open nozzle outlets 104. Although the direct control needle valve is illustrated as being controlled by applying and relieving pressure on a closing hydraulic surface of the needle valve member, the present invention also contemplates other types of direct control needle valve members. For instance, the needle valve member might be driven to move directly by energizing and de-energizing a piezo actuator and/or an electromagnetic actuator in contact with the needle valve member.

Figure 6:
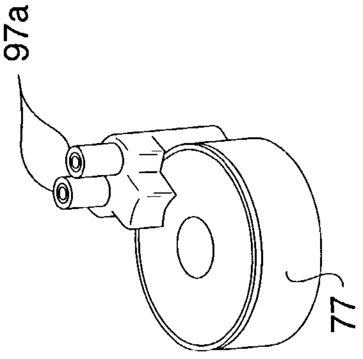
FIG. 6 is an isometric view of an electrical actuator subassembly for the needle control valve shown in FIG. 5.
Figure 5:
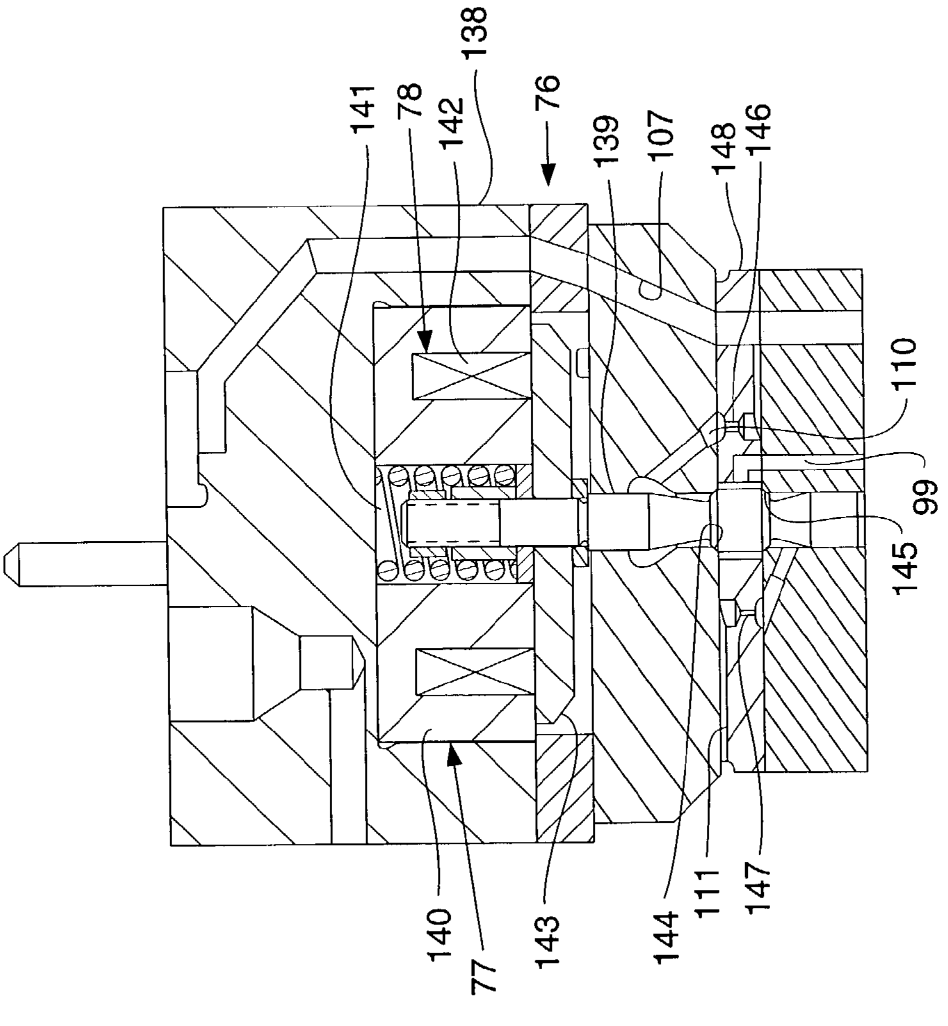
FIG. 5 is a sectioned side view of the needle control valve assembly from the fuel injector of FIGS. 2 and 3.

Referring in addition to FIGS. 5 and 6, the inner workings of needle control valve 76 are illustrated. Valve assembly 76 includes a valve body 138 which defines a portion of nozzle supply passage 107, a connection passage 110, a low pressure passage 111 and a needle control passage 99. The valve assembly 76 is a two position three way valve that includes a needle control valve member 139 that is moveable between contact with a high pressure seat 144 and a low pressure seat 145. Depending upon the position of valve member 139, needle control passage 99, which is fluidly connected to needle control chamber 100 (FIGS. 2 and 3), is fluidly connected to nozzle supply passage 107 via connection passage 110 or to fuel inlet 64 via low pressure passage 111. Needle control valve assembly 76 includes a second electrical actuator 78 which in the illustrated embodiment is a solenoid subassembly 77, but could also be another type of electrical actuator, such as a piezo, a voice coil, etc. The solenoid subassembly 77 includes a stator 140, a coil 142 and a pair of female electrical socket connectors 97 that are electrically connected to coil 142. The female electrical socket connection 97, which could instead be male, permits an electrical extension 96 to mate with solenoid subassembly 77 within injector body 71 while providing exposed terminals for insulated conductors 95 outside of upper portion 66. Valve member 139 is biased downward to close low pressure seat 145 by a biasing spring 141 via an armature 143 that is attached to valve member 139. When coil 142 is energized, armature 143 is lifted upward causing valve member 139 to open low pressure seat 145 and close high pressure seat 144. Because the flow areas past seats 144 and 145 effect the performance of the fuel injector 14, such as by effecting the opening and/or closing rate of direct control valve 79, flow restrictions 146 and 147 are included. In particular, flow restriction 146, which is preferably manufactured in an orifice plate 148 as a flow area that is restrictive relative to the flow area past seat 144. Likewise, flow restriction orifice 147 preferably has a flow area that is restricted relative to the flow past low pressure seat 145. Because these respective orifices 146 and 147 are based upon simple bore diameters rather than a clearance area between two separate moving parts, the performance between respective fuel injectors can be made more uniform. Furthermore, because these features are machined in a single orifice plate 145, the manufactureability and assembly of needle control valve assembly 76 can be improved.

Figure 7:
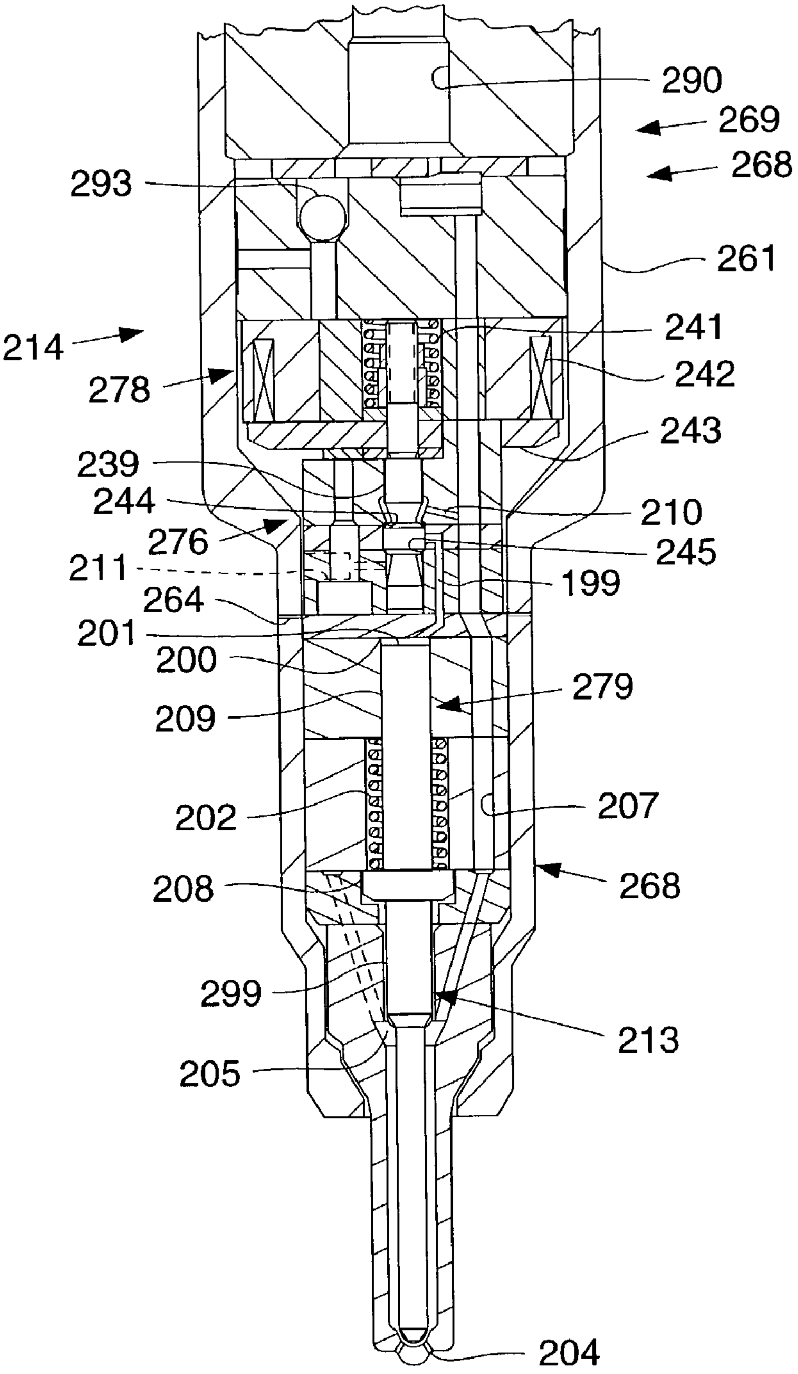
FIG. 7 is a partially sectioned side diagrammatic view of a fuel injector according to another embodiment of the present invention.

Referring now to FIG. 7, a fuel injector 214 according to another embodiment of the present invention includes an injector body 261 with a lower portion 268 that could be used in conjunction with the upper portion 61 of fuel injector 14 shown in FIGS. 2 and 3. This lower portion 268 differs from lower portion 68 in that it includes a reduced diameter portion that effects the structure of needle control valve 276. Like the earlier embodiment, lower portion 268 includes a direct control nozzle assembly 269 which includes a direct control needle valve 279 and a needle control valve 276. Like the earlier embodiment, direct control needle valve 279 includes a direct control needle valve member 213 that includes a needle portion 299 separated from a needle piston portion 209 by a VOP spacer 208. Needle portion 299 includes a opening hydraulic surface exposed to fluid pressure in a nozzle chamber 205 that is fluidly connected to nozzle outlets 204 when direct control needle valve member 213 is lifted to an upward open position. When in such a position, fuel pressurization chamber 290 is fluidly connected to nozzle outlet 204 via nozzle supply passage 207 and nozzle chamber 205. Direct control needle valve member 213 is preferably biased to a downward closed position by a biasing spring 202. Depending upon the positioning of needle control valve 276, needle control chamber 200 is fluidly connected via needle control passage 199 to either nozzle supply passage 207 via connection passage 210, or to fuel inlet 264 via low pressure passage 211. Direct control needle valve member 213 includes a closing hydraulic surface 201 exposed to fluid pressure in needle control chamber 200. When the plunger for fuel injector 214 is undergoing its upward retracting stroke, fuel pushes open check valve 293 to refill fuel pressurization chamber 290 for a subsequent injection sequence. The needle control valve 276 includes a needle control valve member 239 that is moveable by an electrical actuator 278 between a low pressure seat 245 and a high pressure seat 244. Electrical actuator 278 includes a coil 242, a biasing spring 241 and an armature 243 attached to valve member 239. Armature 243, in this embodiment, is preferably a wagon wheel shaped armature such that a body component that includes a portion of nozzle supply passage 207 protrudes through the arms of the armature wagon wheel to provide for fluid communication and permit the reduced diameter shown.

Figure 8:
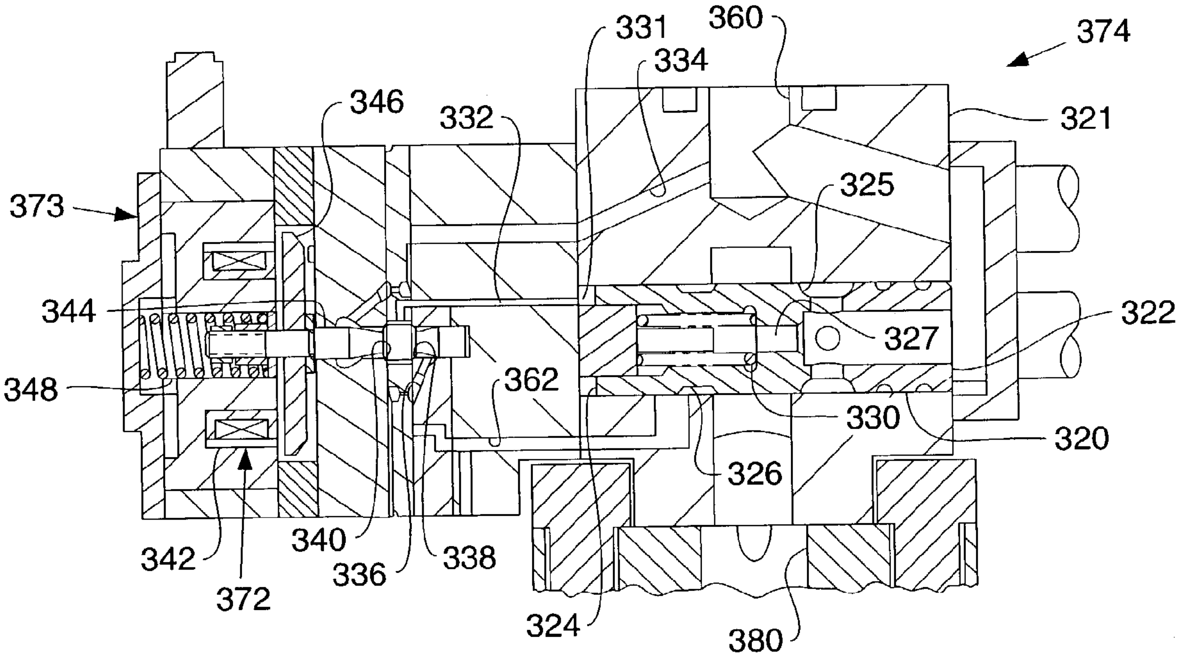
FIG. 8 is a sectioned side diagrammatic view of a flow control valve assembly according to another aspect of the present invention.

Referring now to FIG. 8, a flow control valve assembly 374 according to another embodiment of the present invention could be substituted in place of the flow control valve assembly 74 shown in FIGS. 2–4. Unlike the single stage valve assembly 74 shown in FIGS. 2 and 3, flow control valve assembly 374 includes a pilot valve assembly 373 which controls flow via controlling the positioning of a spool valve member 320. Like the earlier embodiment, flow control valve assembly 374 includes a valve body 321 that includes a top surface with an actuation fluid inlet 360, an actuation fluid drain 362, and an actuation fluid passage 380. Spool valve member 320 includes a biasing hydraulic surface 322 always exposed to fluid pressure inlet 360, and a control hydraulic surface 324 exposed to fluid pressure in a pressure control chamber 331. Hydraulic surfaces 322 and 324 are preferably about equal in effective area such that spool valve member 320 is substantially hydraulically balanced when the fluid pressure acting on the opposite ends is equal. This is facilitated by spool valve member 320 including a pressure communication passage 327. Spool valve member 320 also includes a low pressure annulus 326 that connects actuation fluid passage 380 to actuation fluid drain 362 when spool valve member 320 is biased to its drain position, as shown, by biasing spring 330. When pressure in control chamber 331 is low, fluid pressure on surface 322 moves spool valve member 320 to its actuation position compressing spring 330 and moving annulus and radial passages 325 to communicate fluid from actuation fluid inlet 360 to actuation fluid passage 380. At the same time, annulus 326 moves out of fluid communication with actuation fluid passage 380.

Pressure in control chamber 331 is controlled by pilot valve assembly 373. Pilot valve assembly 373 includes a pilot valve member 344 that moves between a high pressure seat 340 and a low pressure seat 338. When pilot valve member 344 is closing low pressure seat 338, pressure control chamber 331 is fluidly connected to actuation fluid inlet 360 via pressure communication passage 332 and branch passage 334. Pilot valve member 344 is biased to that position by a biasing spring 348. When the electrical actuator 372 is energized, coil 342 attracts armature 346 and pilot valve member 344 to compress spring 348 and close high pressure seat 340. This fluidly connects pressure control chamber 331 to drain passage 362 via control passage 332 and vent passage 336.

Figure 9:
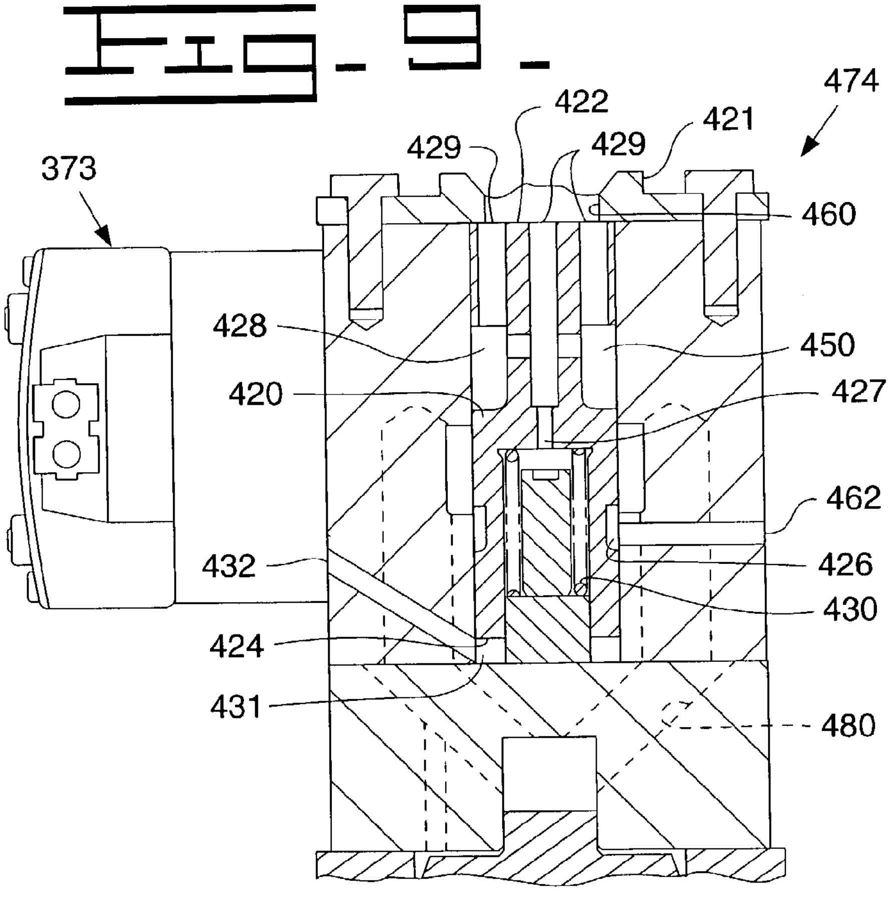
FIG. 9 is a partially sectioned side diagrammatic view of a flow control valve assembly according to still another aspect.

Referring now to FIG. 9, a flow control valve assembly 474 according to still another aspect of the present invention could be substituted in place of the flow control valve assembly 74 shown in FIGS. 2 and 3. This embodiment differs from the embodiment of FIG. 8 in that the spool valve member 420 is oriented vertically instead of horizontally as shown in FIG. 8. Flow control valve assembly 474 includes a pilot valve assembly 373 substantially identical to that shown in FIG. 8. Like the earlier embodiments, flow control valve assembly 474 includes a valve body 421 that includes a top surface with an actuation fluid inlet 460, and actuation fluid drain 462 and an actuation fluid passage 480. Spool valve member 420 includes a biasing hydraulic surface 422 always exposed to the high pressure of actuation fluid inlet 460 and a control hydraulic surface 424 exposed to fluid pressure in a pressure control chamber 431, which is connected to pilot valve assembly 373 via a pressure communication passage 432 similar to that shown in FIG. 8. Spool valve member 420 is normally biased to its upward position, as shown by a biasing spring 430 to connect actuation fluid passage 480 to actuation fluid drain 462 via low pressure annulus 426. When pilot valve assembly 373 connects pressure control chamber 431 to low pressure, spool valve member 420 moves downward to close the actuation fluid drain 462, and open actuation fluid passage 480 to actuation fluid inlet 460 via vertical passages 429 and annulus 428. When high pressure exists in pressure control passage 431, spool valve member 420 is preferably hydraulically balanced via the respective surface areas 422 and 424 as well as the balancing effect provided by pressure communication passage 427.

INDUSTRIAL APPLICABILITY

Each engine cycle can be broken into an intake stroke, a compression stroke, a power stroke and an exhaust stroke. During each engine cycle, each fuel injector 14 has the ability to inject up to five or more discrete shots per engine cycle. While a majority of these injection events will take place at or near the transition from the compression to power strokes, injection events can take place at any timing during the engine cycle to produce any desirable effect. For instance, an additional small injection event elsewhere in the engine cycle might be useful in reducing undesirable emissions. During each engine cycle, a number of basic steps are performed to inject fuel, and each of those acts is performed at a timing and in a number to produce a variety of fuel injection sequences, which include one or more injection events.

Among the steps performed at least once each engine cycle in each portion of the illustrated injection system (e.g., fuel injector) for each engine cylinder is the step of positioning a needle control valve 76, 276 in a position that raises pressure in the needle control chamber 100, 200 by connecting the same to the fuel pressurization chamber 90, 290, and fluidly blocking the needle control chamber 100, 200 to the low pressure passage 111, 211. In the illustrated embodiment, that is accomplished by biasing the needle control valve member 139, 239 into contact to close a low pressure seat 145, 245 by a spring 141, 241. The valve 139, 239 could be biased in the other direction and operate in a manner opposite to that described with regard to the illustrated embodiments. In all cases, that act is performed by a three way valve. With this configuration, the pressurization chamber 90 is only briefly connected to the fuel inlet 64 when the needle control valve member 139, 239 is moving between low pressure seat 145, 245 and the high pressure seat 144, 244. Between injection events when pressure in fuel pressurization chamber 90, 290 is relatively low, very little leakage occurs past needle control valve assembly 76, 276. In addition, little leakage occurs during each injection event since the respective high pressure seats 144, 244 are closed. When the needle control chamber 100, 200 is fluidly connected to the fuel pressurization chamber 90, 290 and blocked from the low pressure passage 111, 211, no fuel injection takes place. In other words, when that occurs, direct control needle valve 79, 279 is preferably held in or moved toward its downward closed position, as shown.

Those skilled in the art will appreciate that applying high pressure to the closing hydraulic surface of a direct control needle valve member can be accomplished in other ways without departing from the present invention. For instance, a two way valve in the low pressure passage (see Bosch APCRS system) could be substituted in place of the three way valve illustrated. In such an example, the needle control chamber is always connected to the nozzle supply passage, but via a flow restriction. Thus, when the two way valve is open, pressure drops in the needle control chamber due to the fact that the flow through the low pressure passage is less restricted than flow coming into the needle control chamber from the nozzle supply passage. When the two way valve is closed, the needle control chamber is only connected to the source of high pressure fuel. In still another alternative, the direct control needle valve member may be controlled in its movement by applying actuation fluid pressure to the closing hydraulic surface instead of fuel as in the illustrated embodiment. This alternative could use either a three way valve similar to that illustrated, or a two way valve in the low pressure passage, as previously described. In most instances, the step of increasing pressure on the closing hydraulic surface of the direct control needle valve member is accomplished by either energizing or deenergizing an electrical actuator. In the present case, electrical actuator 78, 278 is deenergized. In other words, energy to an electrical actuator is either increased or decreased in order to apply high pressure to the closing hydraulic surface of the direct control needle valve member.

In still another possible alternative, the nozzle outlet is held closed by energizing or de-energizing an actuator in contact with the needle valve member. For instance, a piezo actuator and/or an electromagnetic actuator may be in contact to directly control movement of the needle valve member. In such a case, the nozzle outlet is held closed by either de-energizing or energizing the actuator to move the needle toward, or hold it in, its downward closed position.

Another act that is performed at least once during each engine cycle includes increasing fuel pressure within the fuel pressurization chamber 90, 290 at least in part by moving the flow control valve 74, 274, 374, 474 to a first position. The first position described is preferably the position at which valve 74, 274, 374, 474 opens actuation fluid inlet 60, 260, 360, 460 to actuation fluid passage 80, 280, 380, 480. In the case of the embodiments shown in FIGS. 8 and 9, energization of pilot valve assembly 373, 472 causes the spool valve member 320, 420 to connect actuation fluid inlet 360, 460 to actuation fluid 380, 480. When this step is performed, high pressure actuation fluid bears down onto the intensifier piston 82, which compresses fuel in fuel pressurization chamber 90, 290 to injection levels. Thus, in all of the illustrated embodiments, increasing fuel pressure in the fuel injector is accomplished by energizing an electrical actuator 72, 272. Nevertheless, those skilled in the art will appreciate that this step will be accomplished by deenergizing an electrical actuator if the valve is biased in an opposite direction. In addition, those skilled in the art will appreciate that in other fuel injection systems that fall within the present invention, the fuel pressure can be increased within the fuel injector in a number of different ways, including but not limited to rotating a cam to move a plunger within the fuel injector, or a pump, or by connecting the fuel injector to a common rail of pressurized fuel. In another possibility, a mechanically or electronically controlled flow distributor could connect a hydraulically actuated fuel injector to a source of high pressure actuation fluid. In any event, any suitable manner of increasing fuel pressure within a fuel injector is compatible with the end of injection rate shaping of the present invention.

Another act that is performed at least once each engine cycle in the illustrated embodiment, and in some cases many times per engine cycle, includes moving the needle control valve 76, 276 to a second position that fluidly connects the needle control chamber 100, 200 to the low pressure passage 111, 211, and fluidly blocks the needle control chamber 100, 200 to the fuel pressurization chamber 90, 290. This act is accomplished at least in part by increasing electrical energy to an electrical actuator 78 associated with a direct control nozzle assembly 69. In the illustrated example, that includes supplying electrical energy to terminals 95 located outside the upper portion of fuel injector 14 and channeling that electricity via electrical socket connection 97 to electrical actuator 72, 272 located in the lower portion 68, 268 of the injector body 61, 161. When this occurs, needle control valve 39, 239 is lifted to close high pressure seat 144, 244 such that needle control chamber 100, 200 is fluidly connected to low pressure passage 111, 211. If fuel pressure in nozzle chamber 105, 205 is above a valve opening pressure, the direct control needle valve 79, 279 will move to, or stay in, an open position that fluidly connects fuel pressurization chamber 90, 290 to nozzle outlet 104, 204 via nozzle supply passage 107, 207. If fuel pressure is below a valve opening pressure, the direct control needle valve 79, 279 will move toward, or stay in, its biased closed position due to the action of biasing spring 102, 202 being the dominant force. Thus, each injection event is initiated by relieving pressure on the closing hydraulic surface of a direct control needle valve member. In the illustrated embodiment this is accomplished by energizing the electrical actuator associated with a three way needle control valve. Those skilled in the art will appreciate that if the valve were biased in an opposite direction, this same act of relieving pressure could be accomplished by deenergizing an electrical actuator. In addition, in the case of a two way needle control valve positioned in the low pressure passage, (see Bosch APCRS system) this is accomplished by energizing an electrical actuator to open the low pressure passage connected to the needle control chamber. In still other versions of the present invention, the direct control needle valve member is moved to an open position by energizing or de-energizing either a piezo actuator and/or an electromagnetic actuator in contact with the needle valve member. Thus, in all cases of the present invention, an injection event is initiated by moving a direct control needle valve member to a position that opens the nozzle outlet.

Another step that occurs at least once each engine cycle includes decreasing fuel pressure in the fuel pressurization chamber 90, 290 at least in part by moving a flow control valve 74, 274, 374, 474 to a position that fluidly connects the actuation fluid passage 80, 280, 380, 480 to the actuation fluid drain 62, 262, 362, 462. In the illustrated embodiments, this is the act that allows the fuel injector 14, 214 to reset itself for a subsequent injection sequence. When this step occurs, intensifier piston 82 and plunger 84 will stop moving downward and will begin to retract upward toward their retracted positions as shown, under the respective actions of return spring 83 and fuel pressure in fuel pressurization chamber 90, 290. In all of the illustrated embodiments, this act is accomplished by ending or reducing electrical energy to actuator 72, 372 in order to allow flow control valve 74, 274, 374, 474 to return to its biased position that opens actuation fluid drain 62, 262, 362, 462. In other types of fuel injection systems that fall within the scope of the present invention, fuel pressure is reduced in the fuel injector in different ways. For instance, a cam actuated fuel injection system might include a spill valve that is operated by an appropriate electrical actuator to spill fuel at an appropriate timing to relieve fuel pressure within the fuel injector. Reducing fuel pressure could also be accomplished in the illustrated embodiment by including either a fuel spill valve to spill pressurized fuel back to the low pressure supply, or possibly even an actuation spill valve that would relieve pressure on the top surface of the intensifier piston.

Each of these steps is performed a number of times and at particular timings to produce a wide variety of injection event profiles. Whether the front of injection takes on the shape of a boot, ramp or a square is related in the illustrated embodiment with the relative timing of opening the actuation fluid passage 80 to high pressure flow from the rail, and the step of relieving pressure in needle control chamber 100, 200. Although the illustrated embodiments show fuel injectors having separate actuation fluid inlets from fuel inlets, some aspects of the present invention are directly applicable to systems, such as Bosch APCRS, in which the fuel and actuation fluid inlets are one in the same. Because fuel pressure between injection events is usually low and because the fuel pressurization chamber 90, 290 is blocked from the actuation fluid inlet 64 while injecting, the illustrated system can achieve low leakage rates. This leakage occurs over that brief instant when the fuel pressurization chamber 90, 290 is directly connected to the low pressure passage 111, 211 as the valve member 139, 239 moves between seats. Because of the quick action of needle control valve 76 with direct control needle valve 79, the system can achieve short dwell times between a pilot and/or post with a main injection event. In addition, these small injection events, including small splitting injection events at idle can be produced reliably and consistently with relatively low volumes on the order of about ten cubic millimeters. For instance, a combined total split injection in about equal shots with combined volume of about 25 cubic millimeters at idle are achievable.

The system produces various front rate shapes including square, ramp, a boot or even an electronic rate shape that lies somewhere between a boot and a ramp, via the timing in actuating flow control valve 74, 374, 474 relative to needle control valve 76, 276. The relative timing of the actuators associated with these two valves, along with the fact that the intensifier piston 82 may include a stepped top, allows for a variety of front end rate shapes. In order to produce a boot shaped front end, needle control valve 76, 276 is actuated before or at about the same time as flow control valve 74, 374, 474. By doing so, the closing hydraulic surface 101, 201 of direct control needle valve 79, 279 is exposed to low pressure passage 111, 211 before the fuel pressure in fuel pressurization chamber 90, 290 is above valve opening pressures. Thus, in order to maximize a boot front end, the needle control valve 76, 276 should be actuated before the fuel pressure in fuel pressurization chamber 90, 290 is above valve opening pressures. When this occurs, the full affect of the top hat of intensifier piston 82 is exploited. In other words, the intensifier piston's 82 initial downward movement is relatively slow since high pressure is mostly acting only via actuation fluid passage 80 on the central small area portion of intensifier piston 82. The flow of fluid to the annular shoulder portion of intensifier piston through passage 81 is relatively restricted so that the hydraulic force on the annular shoulder is lower than the hydraulic pressure force acting on the central top hat portion of intensifier piston 82. The length of the toe of the boot shape is determined by the height of the central top hat portion of intensifier piston 82. In other words, when the central top hat portion clears its counter bore in passage 80, high pressure can act over the entire top surface of intensifier piston 82 causing its movement to accelerate and injection pressures to go up (the instep of the boot). Thus, when producing a boot shaped front end, direct control needle valve 79, 279 is set to behave like an ordinary spring biased check valve, and the rate shape is influenced by the top hat geometry of the intensifier piston along with the relative flow areas of actuation fluid passages 80 and 81.

When a square shaped front end is desired, the actuation of needle control valve 76, 276 is delayed relative to that of flow control valve 74, 374, 474. In other words, the flow control valve opens, and high pressure acts on the top of intensifier piston 82 causing it to move slightly downward to compress fuel in fuel pressurization chamber 90, but direct control needle valve 79, 279 remains in its downward closed position due to the force of high pressure fuel acting on closing hydraulic surface 101, 201. The slight movement of intensifier piston 82 and plunger 84 downward reflects the compressibility of the fuel in fuel pressurization chamber 90 and nozzle supply passage 107. Because direct control needle valve 79, 279 is held closed, oil pressure acting on the top of intensifier piston 82 is relatively high in the central portion exposed to actuation fluid passage 80, as well as the annular should or portion, which is supplied by relatively restricted passage 81. When needle control valve 76, 276 is finally actuated, high oil pressure is pushing on the entire top surface of intensifier piston 82, and fuel in fuel pressurization chamber 90 is already at pressures that are well above the valve opening pressure of direct control needle valve 79, 279. As a result, when direct control needle valve 79, 279 moves to its open position, the injection rate goes from zero to near its maximum rate in a very short amount of time. Thus, the effect of the piston's top hat can be virtually negated to produce a square front end rate shape by delaying the activation of needle control valve 76, 276 until after fuel pressure within the injector is well above valve opening pressure, and approaching its maximum injection pressure level at that rail pressure.

A ramp shaped front end and a electronic rate shaping (ERS) front end illustrated, respectively, are accomplished by activating needle control valve 76, 276 at a location in between that which would produce a boot shaped front end and that which would produce a square shaped front end. In other words, direct control needle valve 76, 276 is activated at a timing that will take some advantage of the piston's top hat but not the entire potential effect of the same. Thus, with appropriate timing of the activation of needle control valve 76, 276 relative to that of flow control valve 74, 374, 474 a continuity of different front end rate shapes ranging from a boot to a square can be accomplished through electronic control independent of engine speed and load.

The present invention also affords the possibility of performing end of injection rate shaping in a manner similar to the front end rate shaping. The present system allows the idea that main injection events should terminate as abruptly as possible to be revisited. It might be desirable in some instances, to produce a more gradually decreasing flow rate at the end of an injection event in contrast to a relatively abrupt ending. Again, like front end rate shaping, this is accomplished by the relative timing in the deactivation of needle control valve 76, 276 relative to that of flow control valve 74, 374, 474. At one extreme of this procedure, needle control valve 76, 276 is deactivated before, or at about the same time as, flow control valve 74, 374, 474. By doing so, direct control needle valve 79, 279 is abruptly shut, even though fuel pressurization chamber 90, 290 is at a relatively high pressure level. At another extreme, needle control valve 76, 276 is deactivated well after that of flow control valve 74, 374, 474 such that direct control needle valve 79, 279 is closed under the action of its biasing spring, 102, 202 without any substantial hydraulic assistance acting on closing hydraulic surface, 101, 201. Thus, in this extreme, the closing procedure of direct control needle valves 79, 279 is much like that of a conventional spring biased check, in that the needle closes when fuel pressure drops below a valve closing pressure which is determined by the pre-load of biasing spring 102, 202. Between these two extremes a variety of different end of injection rate shapes can be produced. For instance, the needle control valve 76, 276 can be deactivated after deactivation of flow control valve 74, 374, 474 such that fuel pressure levels have dropped within the fuel injector, but the deactivation occurs before fuel pressure has dropped below valve closing pressure. In such a case, there would be some gradual reduction in injection flow rate at the end of the injection event followed by an abrupt closure. Thus, those skilled in the art will recognize that some substantial amount of rate shaping flexibility is available by controlling the relative timing of the deactivation of flow control valve 74, 374, 474 relative to the deactivation of needle control valve 76, 276. In all cases of the present invention, fuel pressure is reduced before the direct control needle valve member reaches its closed position, regardless of how pressure is reduced or the needle valve member is moved.

Figure 10A:
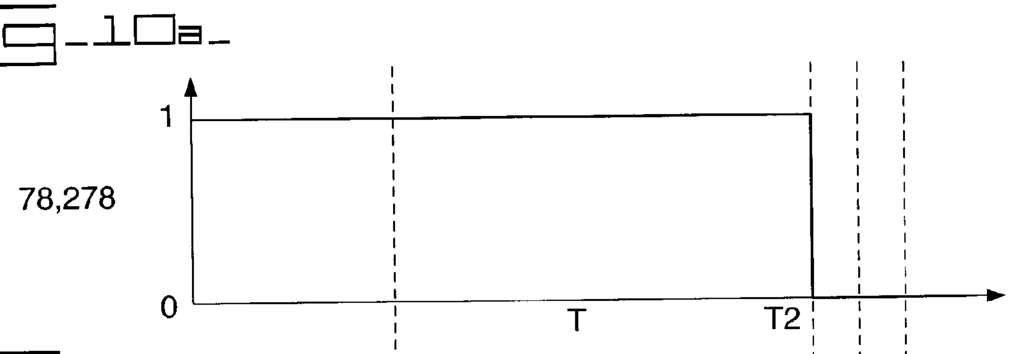
FIGS. 10*a–e* are graphs of first electrical actuator control signal, second electrical actuator control signal, direct control needle valve member position, pressure, and fuel injection rate, verses time for an end of injection event according to one aspect of the present invention.
Figure 10B:
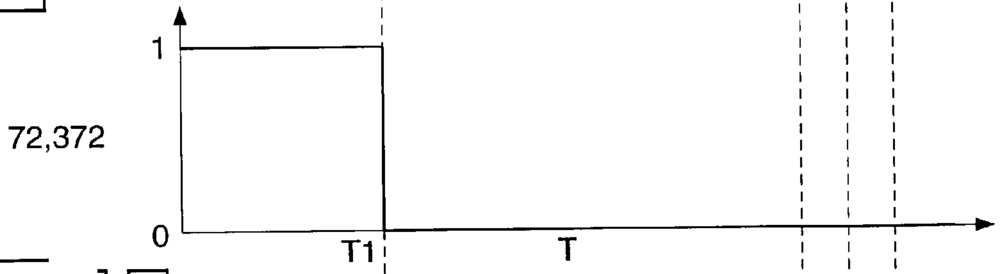
Figure 10C:
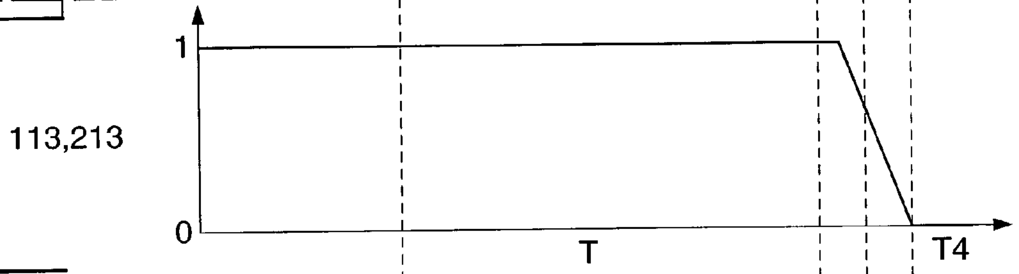
Figure 10D:
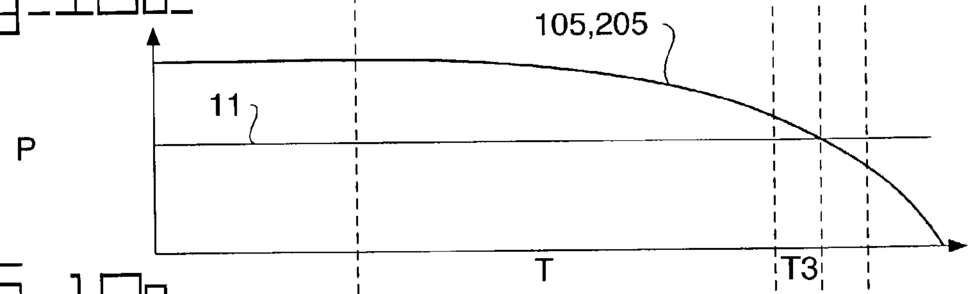
Figure 10E:
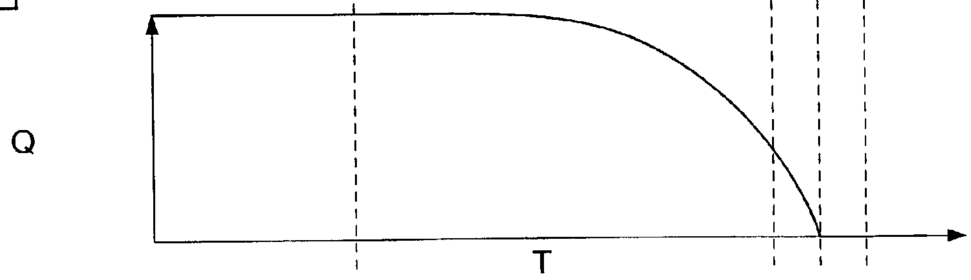

Referring now to FIGS. 10*a–e*, one example strategy for employing end of injection rate shaping according to the present invention is graphically illustrated. These graphs show only the end portion of an injection event, which spans a relatively brief instant in time. FIG. 10*a* shows the energization state of the electrical actuator 78, 278 associated with the direct control needle valve, with one representing an energized state and zero representing a deenergized state. FIG. 10*a* shows electrical actuator 78, 278 being deenergized at a time $T_2$. FIG. 10*b* shows the energization state of the electrical actuator 72, 372 associated with the flow control valve, with one representing an energized state and zero representing a deenergized state. Note that electrical actuator, 72, 372 is deenergized at a time $T_1$ that is at some predetermined timing before timing $T_2$. By deenergizing electrical actuators 72, 372 before deenergizing electrical actuator 78, 278, fuel pressure within the nozzle chamber 105, 205 begins dropping at some delay time period after time $T_1$ as illustrated in FIG. 10*d*. For simplicity sake, cylinder pressure 11 is illustrated in FIG. 10*d* as remaining relatively constant over the brief period of time represented by the graphs of FIGS. 10*a–e*. Nevertheless, cylinder pressure in a particular application may either be increasing or decreasing over the time period represented in these Figures. FIG. 10*c* shows that the direct control needle valve member 113, 213 remains in its open position (1) through and after the time period $T_2$. After some brief delay time period after $T_2$, the direct control needle valve member 113, 213 begins moving from its open position (1) toward its closed position (0), which occurs at a time $T_4$. In one embodiment of the present invention, the relative timings of $T_1$ with respect to $T_2$ is such that fuel pressure in nozzle chamber 105, 205 drops to cylinder pressure 11 (FIG. 10*d*) at a time $T_3$ that is after the direct control needle valve member has begun moving toward its closed position but before it has reached its seat at time $T_4$. Preferably, this pressure in the fuel injector drops to equal cylinder pressure when the direct control needle valve member 113, 213 has completed about 80–90% of its travel toward its closed position. Those skilled in the art will appreciate that the actual injection of fuel as shown in FIG. 10*e* stops when the fuel pressure within the injector equals cylinder pressure, rather than when the direct control needle valve member 113, 213 arrives at its seat. However, the present invention does include seating the needle valve member before fuel pressure has dropped to cylinder pressure.

By ending the injection event before the nozzle outlet is blocked by the direct control needle valve member 113, 213 arriving at its seat, the dribbling of a small amount of fuel toward the end of an injection event can be reduced. By eliminating these potentially small amounts of fuel dribble into the engine cylinder 11, hydrocarbon and smoke emissions from the engine can be drastically reduced. This end of injection rate shaping strategy of the present invention can be employed in virtually any sized injection event, including pilot, main and post injection events. In addition, other types of fuel injection systems can also employ this strategy to produce similar results. For instance, in the case of a cam actuated fuel injection system with a fuel pressure spill valve, the spill valve would be opened at some timing $T_1$ before the needle control valve is activated to increase high pressure on the closing hydraulic surface of its direct control needle valve member. Thus, those skilled in the art will appreciate that the end of injection rate shaping strategy of the present invention extends to virtually any type of fuel injection system that includes a direct control needle valve member and a means of changing fuel pressure within the fuel injector.

Although a primary benefit of the present invention includes lowering hydrocarbon and smoke emissions, the end of injection rate shaping strategy of the present invention also can produce other beneficial affects. For instance, another benefit includes a reduction in injection pressure overshoot in the tip/sleeve of the fuel injector. This phenomenon relates to the fact that if you close the needle while fuel injection pressure is high and the high pressure oil is still pushing the intensifier piston/plunger downward, fuel pressure can spike within the injector as the needle closes. These pressure spikes can be relatively high and influence how robust the structural aspects in the tip region of the injector must be in order to withstand these high pressures. By reducing fuel pressure to cylinder pressure as the needle closes, there will no longer be these high pressure overshoots, and the tip/sleeve structure can be made less robust or less strong and still be able to perform with the expected pressure levels. Another advantage of the end of injection rate shaping strategy relates to efficiency. If the needle valve member is forced shut while the flow control valve remains open, some amount of high pressure fluid is wasted as it continues to flow into the fuel injector when the needle valve member is closing, and for a brief period of time after it closes. By closing the flow control valve before closing the needle, fluid pressure on the intensifier piston can be relieved, and the piston/plunger can come to a stop before the needle closes and without wasting any excess high pressure oil. Those skilled in the art will appreciate that an amount of engine horsepower is wasted whenever the engine pressurizes oil that is not utilized to perform useful work. Thus, the end result is a small savings in energy by not wasting an amount of pressurized oil at the end of an injection event. Still another advantage relates to the ability to make small post injection quantities available due to lower gain factors as pressure is reduced. This aspect of the invention relates to the fact that if you are able to lower fuel pressure, you can expand the duration of a post injection event. It is known that it is far easier to control the quantity delivered if the duration of the injection event is longer. When injection pressure is very high throughout an injection event, it is often difficult to inject very small quantities with reliable accuracy. The strategy of the present invention allows for lower injection pressures at least over a portion of the injection event, which can result in some improvement in the ability to reliably inject ever smaller quantities of fuel at a given rail pressure.

With regard to pilot injections, the present invention has the capability of reliably and consistently producing relatively small injection amounts. In addition, the fuel injection system has the ability to control whether those pilot injections occur at higher or lower pressures. This again is accomplished by the relative timing of the activation of flow control valve 74, 374, 474 relative to the activation of needle control valve 76, 276. In other words, if the pilot injection is desired to occur at a relatively lower injection pressure, flow control valve 74, 374, 474 and needle control valve 76, 276 are actuated close in time to take advantage of the lower initial injection pressures afforded by the slower initial movement of intensifier piston 82 due to its top hat design. In such a case, the pilot injection amount is often so small that needle control valve 76, 276 is deactuated well before the top hat of intensifier piston 82 clears its counter bore. Thus, the pressure at which the pilot injection occurs is influenced by the relative timing of actuation of the flow control valve relative to the needle control valve, but the quantity of fuel injected is still tightly controlled by the actuation duration of needle control valve 76, 276. In the event that the pilot injection is desired to occur at relatively higher injection pressures, the actuation of needle control valve 76, 276 is delayed relative to that of flow control valve 74, 374, 474 in a manner similar to that described with respect to producing a square front end rate shape. In other words, fuel pressure is allowed to rise to levels well above valve opening pressure before needle control valve 76, 276 is actuated.

The fuel injection system of the present invention also has the ability to combine pilot injections with a variety of front end rate shapes. This again is accomplished by the relative timing in the actuation and deactuation of needle control valve 76 relative to the actuation, and possible deactuation, of flow control valve 74, 374, 474. The closer in time that the pilot injection event occurs to the starting of the main injection event, the less flexibility the fuel injection system has in controlling both the injection pressure of the pilot and the front end rate shape of the main injection event independent of one another. On the other hand, if the dwell between the pilot injection event and the main injection event is sufficiently long in duration, the fuel injector may actually have sufficient time to deactivate flow control valve 74, 374, 474 between the pilot and main injection events in order to allow for more independent control of the pilot injection pressure relative to the front end rate shape of the main injection event. When the pilot injection quantities are relatively small, the injection event can occur so quickly that direct control needle valve 79, 279 only has time to partially open before it again is hydraulically pushed shut. The ability to consistently produce small injection quantities, even when the direct control needle valve 79, 279 does not go completely open, is accomplished by the relatively fast moving needle control valve 76, 276 that does move completely between its upper and lower seats, even during a relatively small quantity pilot injection event.

The fuel injection system of the present invention also has the capability of producing relatively small post injection events with dwell times from the end of the main injection event under 500 microseconds and often on the order of about 350 microseconds. Like front end rate shaping, the fuel injector also has the ability to do some end of injection rate shaping and control whether the post injection is done at a relatively high or low injection pressure level. This again is controlled by the relative timing of the activation and deactivation of needle control valve 76, 276 relative to the deactuation timing of flow control valve 74, 374, 474. For instance, if a close in time post injection is desired, the needle control valve 76 is deactuated to end the main injection event, and then a short time later is actuated and then deactuated again to produce the post injection event. The flow control valve 74, 374, 474 is deactuated at around the time that the needle control valve 76, 276 is deactuated to end the post injection event. If the post injection event is desired to occur at a relatively lower injection pressure, the flow control valve 74, 374, 474 is deactuated at some timing before needle control valve 76, 276 is actuated to begin the post injection event. In other words, the fuel pressure is allowed to drop in the injector before the post injection event is initiated. This permits a main injection event at a relatively high injection pressure followed by a post injection event at a lower injection pressure level. In addition, the relative timings of actuation and deactuation of flow control valve 74, 374, 474 relative to needle control valve 76, 276 can allow for some end of injection rate shaping in tandem with some independent control over the injection timing and pressure of a post injection event.

All of these proceeding front end rate shaping, end of injection rate shaping strategies, post injections, pilot injections can all be combined in different combinations to produce a very wide variety of injection sequences that include one or more injection events with a variety of rate shapes, quantities, and dwells. In addition, these injection characteristics can be controlled with some substantial independence from one injection to another within a given injection sequence. This capability allows the fuel injection strategy at each engine speed and load to be tailored to produce some particular effect, such as reduced emissions.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of operating a fuel injection system, comprising the steps of:

moving a direct control needle valve member to open a nozzle outlet at least in part by positioning a needle control valve member at one of at least two available positions and positioning a flow control valve member at one of at least two available positions; and ending an injection event at least in part by reducing fuel pressure before the direct control needle valve member has reached a closed position.

2. The method of claim 1 wherein said moving step includes a step of reducing or increasing an energy supply to a first electrical actuator operably coupled to the needle control valve member; and said reducing step includes a step of reducing an energy supply to a second electrical actuator operably coupled to the flow control valve member.

3. The method of claim 1 wherein said moving step includes a step of moving the needle control valve member from a first position toward second position; and said reducing step includes a step of moving this flow control valve member from an open position toward a closed position while the direct control needle valve member is away from a closed position.

4. The method of claim 1 including a step of applying pressurized actuation fluid to an intensifier piston; and the reducing step includes reducing fuel pressure to cylinder pressure before the direct control needle valve member reaches said closed position.

5. The method of claim 4 wherein said reducing step includes a step of relieving pressure on the intensifier piston.

6. The method of claim 5 wherein said moving step includes a step of relieving pressure on a closing hydraulic surface of the direct control needle valve member; and said step of reducing fuel pressure includes a step of moving the flow control valve member from an open position toward a closed position while the direct control needle valve member is away from said closed position.

7. The method of claim 6 wherein said step of relieving pressure on a closing hydraulic surface includes a step of reducing or increasing an energy supply to a first electrical actuator operably coupled to the needle control valve member; and said step of reducing fuel pressure includes a step of reducing an energy supply to a second electrical actuator operably coupled to the flow control valve member.

8. A method of rate shaping the end portion of a fuel injection event, comprising the steps of:

relieving pressure on an intensifier piston at a first timing; and then moving a needle control valve at a second timing that is independent of the first timing;

wherein said second timing relative to said first timing is sufficient to cause fuel pressure in a fuel injector to drop before a direct control needle valve member has reached a closed position.

9. The method of claim 8 wherein said relieving pressure step includes a step of reducing an energy supply to a first electrical actuator operably coupled to a flow control valve member; and said moving step includes a step of reducing or increasing an energy supply to a second electrical actuator operably coupled to a needle control valve member of the needle control valve.

10. The method of claim 9 wherein said moving step includes a step of reducing an energy supply to a second electrical actuator.

11. The method of claim 10 wherein said moving step includes a step of moving the direct control needle valve member from an open position toward a closed position; and said relieving pressure step includes a step of moving the flow control valve member from an open position toward a closed position.

12. The method of claim 8 wherein said moving step includes a step of moving the direct control needle valve member from an open position toward a closed position; and said relieving pressure step includes a step of moving a flow control valve member from an open position toward a closed position.

13. A fuel injector comprising:

an injector body having a needle control chamber disposed therein;

a direct control needle valve member movably positioned in said injector body and including a closing hydraulic surface exposed to fluid pressure in said needle control chamber; and means, including a flow control valve member and a needle control valve member with independently controlled positioning, for reducing fuel pressure within said injector body before said direct control needle valve member has reached a closed position.

14. The fuel injector of claim 13 including the needle control valve member positioned in said injector body and movable between a first position in which said needle control chamber is fluidly connected to a high pressure passage, and a second position fluidly connected to said low pressure passage; and an electrical actuator operably coupled to move said needle control valve member.

15. The fuel injector of claim 14 wherein said needle control chamber is blocked to said low pressure passage when said needle control valve member is in said first position; and said needle control chamber is blocked to said high pressure passage when said needle control valve member is in said second position.

16. The fuel injector of claim 14 wherein said electrical actuator is a first electrical actuator; and said means for reducing fuel pressure includes a movable plunger positioned in said injector body, the flow control valve member being at least partially positioned in said injector body and being movable between a first position and a second position, and a second electrical actuator attached to said injector body and operably coupled to move said flow control valve member.

17. The fuel injector of claim 16 including an intensifier piston positioned in said injector body and movable with said plunger, and including a hydraulic surface; and said hydraulic surface being exposed to fluid pressure in a low pressure actuation fluid passage when said flow control valve member is in said first position, and exposed to fluid pressure in a high pressure actuation fluid passage when said flow control valve member is in said second position.

18. The fuel injector of claim 17 wherein said injector body includes a fuel inlet and a nozzle supply passage disposed therein;

said high pressure passage includes a portion of said nozzle supply passage; and said low pressure passage is fluidly connected to said fuel inlet.

19. The fuel injector of claim 13 wherein said means for reducing fuel pressure includes an electronic control module in control communication with a first electrical actuator operably coupled to the flow control valve member and a second electrical actuator operably coupled to needle control valve member; and said electronic control module including programming to terminate an energy supply to said first electrical actuator before terminating an energy supply to said second electrical actuator.

* * * * *